United States Patent [19]

Markert et al.

[11] Patent Number: 4,576,768

[45] Date of Patent: Mar. 18, 1986

[54] METHOD FOR IMPREGNATING AND EMBEDDING ELECTRICAL WINDINGS

[75] Inventors: Helmut Markert, Nuremberg; Wolfgang Rogler, Erlangen; Wolfgang Bendel, Leonberg; Friedrich Alber, Köngen, all of Fed. Rep. of Germany

[73] Assignee: Siemens Aktiengesellschaft, Munich, Fed. Rep. of Germany

[21] Appl. No.: 624,983

[22] Filed: Jun. 27, 1984

[30] Foreign Application Priority Data

Jun. 27, 1983 [DE] Fed. Rep. of Germany ....... 3323154

[51] Int. Cl.[4] ............................................ B29C 35/02

[52] U.S. Cl. .................................... 264/27; 264/235; 264/236; 264/272.13; 264/272.19

[58] Field of Search ...................... 264/272.13, 272.19, 264/27, 235, 336

[56] References Cited

U.S. PATENT DOCUMENTS

| | | | |
|---|---|---|---|
| 4,070,416 | 1/1978 | Narahara et al. . | |
| 4,131,600 | 12/1978 | Ihlein et al. | 528/53 |
| 4,333,900 | 6/1982 | Carey | 264/272.19 |

FOREIGN PATENT DOCUMENTS

| | | | |
|---|---|---|---|
| 742413 | 12/1955 | United Kingdom | 264/272.19 |

*Primary Examiner*—James Lowe

*Attorney, Agent, or Firm*—Kenyon & Kenyon

[57] ABSTRACT

The invention relates to a method for impregnating and embedding electrical windings, especially coils of transformers, by means of an impregnating or casting resin based upon polyepoxide-polyisocyanate mixtures in the presence of a reaction accelerator latent at the processing conditions, which employs conditions that prevent the formation of gas and shrinkage voids in the cast in winding. To this end, the resin including, if applicable, additives, is dried at reduced pressure and while stirring at temperatures of up to 110° C. and the winding is cast-in with the dried resin at reduced pressure and at temperature of up to 110° C.; then the reduced pressure is removed and the winding is exposed to overpressure. Subsequently, generating by an elevated temperature in the electrical winding by Joule heat in the conductor, the cross-linking reaction of the resin is started and is controlled as a function of the reaction heat, until the winding is removed from the mold and post-hardened.

14 Claims, 3 Drawing Figures

METHOD FOR IMPREGNATING AND EMBEDDING ELECTRICAL WINDINGS

BACKGROUND OF THE INVENTION

The invention relates to a method for impregnating and embedding electrical windings, especially coils of transformers, by means of impregnating or casting resins of polyepoxy-polyisocyanate mixtures in the presence of a reaction accelerator which is latent under the processing conditions.

In electrotechnology, the impregnation and casting-in of windings in electric machines and in coils of dry transformers is of great technical and economical importance. For improving the power/weight ratio and for higher thermal stressability, reaction resin molded materials with good mechanical, thermal and electrical properties are required. Special requirements as to the molded materials arise if, for instance, in the case of transformers, the potential breakdown is not effected by air cooling sections, but it to be effected largely in the reaction resin molded material. Also, the reaction resin molded materials are subjected to high mechanical and thermal stresses when a temperature cycle resistance to −50° C. is to be provided and at the same time, for example in the case of transformers, the requirements of temperature classes F to H are to be fulfilled.

Consequently, effective resistance against such destructive stresses in reaction resin molded materials is exhibited by a molded material which contains in its structure oxazolidinone and isocyanurate rings. Such a molded material is produced from resin ingredients of polyepoxides and polyisocyanates. These resin ingredients are abbreviated EP/IC resins herein and the corresponding molded materials are abbreviated OX/ICR molded materials herein.

It is known that EP/IC resins employ hardening, i.e., cross-linking, which generally takes place in the presence of accelerator systems (catalysts) and which results in production of OX/ICR molded material with excellent dimensional heat stability (see, for instance: DE-AS No. 1 115 922; col. 5, lines 9 to 14; DE-AS No. 1 963 900: col. 1, lines 4 to 13 and 48 to 60, and U.S. Pat. No. 4,070,416). It is furthermore known to use EP/IC resin as an impregnating resin for windings in electric equipment, especially for rotating electric machines; and transformers (see, for instance, U.S. Pat. Nos. 4,131,600; 4,239,998 and 4,304,818). Until the present invention, however, it was not known how to impregnate and embed electrical windings with EP/IC resins in a fashion which would avoid production of void spaces within the resin.

A fundamental problem with EP/IC resins is that the polyisocyanates contained therein react with water and produce $CO_2$ gas, which creates void spaces within the resulting cross-linked OX/ICR molded material. A winding impregnated with such a molded material containing void spaces cannot be used because the void spaces permit the partial discharge of current when the winding is under electrical stress. Small amounts of water are sufficient to form disturbing $CO_2$ gas. It can be present as an impurity of components of the EP/IC resins such as epoxy resins and fillers. Also, the small amounts of water present in the windings are sufficient to form $CO_2$ gas.

The processing and cross-linking conditions used at present for epoxy resins are not suitable for the production of embedded windings without voids. It has been found that the conditions for drying and degassing lead neither to the complete removal of residual water contents in the components of the EP/IC resins, nor to the removal of residual water content from the windings. Complete dehydration of the windings cannot be achieved even when high drying temperatures and reduced pressure are applied. Also, expensive drying measures cannot be carried out if economical production is to be assured. Further, the technically customary procedures of hardening the impregnated and cast-in windings in annealing ovens will not produce embedments free of gas and shrinkage voids because dwelling times in the annealing oven of many hours long are needed to cause the gelling of the reaction resins. These long dwelling times cause an increased tendency to form $CO_2$ through reaction of the isocyanate component with residual water in the winding. Moreover, the cross-linking of the EP/IC resins in the annealing oven does not yield a temperature-cycle-resistant and surge-proof embedment especially for larger wall thicknesses of the insulation, since the cross-linking of the EP/IC resins takes place from the outer zones inward. These factors lead to high internal stresses and shrinkage voids in the EP/IC resins.

Therefore, it is an object of the invention to develop procedures which are reliable and which avoid the formation of gas and shrinkage voids when impregnating and embedding electrical windings with EP/IC resins which are cross-linked to form OX/ICR molded materials.

SUMMARY OF THE INVENTION

According to the invention, these and other objects are achieved by the provision that the EP/IC resins, which optionally include additives, are dried at reduced pressure and at temperatures up to 110° C. and while stirring; that the electrical windings are dried and impregnated or cast-in with the dried EP/IC resins at reduced pressure and at temperatures of up to 110° C.; that the reduced pressure is removed and an overpressure is applied; and that by the temperature generated by Joule heat in the conductor of the electrical winding, the cross-linking reaction of the EP/IC resins is initiated and is controlled, as a function of the reaction heat, to produce cross-linked OX/ICR molded material. The Joule heat control is used until the removal from the mold and post-hardening of the impregnated or cast-in windings.

DETAILED DESCRIPTION OF THE INVENTION

Figure 1:
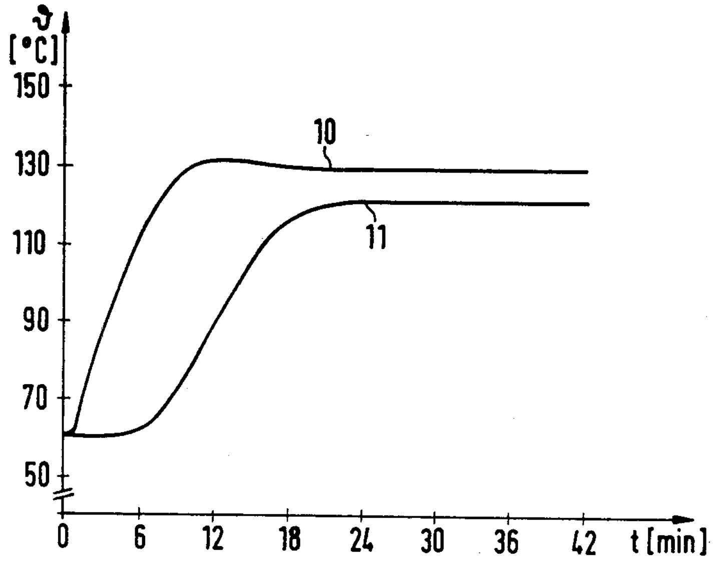
FIGS. 1, 2 and 3 illustrate the temperature and cross linking curves for the molding resin mixtures of some of the Examples.

In the method according to the invention, the EP/IC resins are first dried and degassed. A chemical drying or dehyration takes place thereby which is accomplished by the polyisocyanates present in the EP/IC resins which react with water while splitting off $CO_2$. In practice, the procedure is that the EP/IC resins including all additives, are treated at elevated temperature at reduced pressure and while stirring intensively, until no further $CO_2$ is produced. The latent reaction accelerator can be present in the EP/IC resin from the start or can be added to the latter after a given pretreatment time. In particular, it has been found that, while drying temperatures under 50° C. are possible, they are uneconomical because of the long drying time then required. Advantageously, the EP/IC resin mixture is treated at reduced pressure and while stirring, at temperatures from 50° to 80° C. for dehydration and degassing. At 80° C., for example, the drying is then complete after about 1 hour. After the drying, the EP/IC resins are kept at the conditions prevailing during the drying operation until further processing, i.e., the impregnation or casting-in of the electrical windings.

The windings themselves are dried and degassed prior to the impregnation or the casting-in with the EP/IC resins preferably at temperatures up to 80° C. and at reduced pressure, where the drying and degassing can advantageously be aided by Joule heat in the electric conductor. The windings are then kept at these conditions for the pressure and temperature up to the impregnation and embedment with the EP/IC resins; the heating of the windings, however, is switched off.

With the method according to the invention, the impregnation and the casting-in of the windings with the EP/IC resins are carried out at reduced pressure and at temperatures of up to 110° C.; the temperature of the EP/IC resins is then preferably room temperature to 80° C. Immediately after the completion of the impregnation or the casting-in of the windings, the reduced pressure is removed and an overpressure, preferably about 1 to 3 bar overpressure, is brought about. Thereupon, the cross-linking of the EP/IC resins is initiated by Joule heat in the conductor to produce OX/ICR molded material and is controlled until the windings are removed from the mold and post-hardened. The temperature generated in the windings by Joule heat in the conductor is preferably 60° to 140° C. Finally, post-hardening takes place in the annealing oven at temperatures of up to 220°.

With the method for impregnating and embedding of windings with EP/IC resins according to the invention, the formation of gas and shrinkage voids is reliably prevented. This is determined by the following measures:

(a) The reaction of polyisocyanate with water, which produces, inter alia, $CO_2$, allows production of EP/IC resins free of water and gas in a technically simple and economical manner.

(b) The formation of gaseous carbon dioxide through reaction of isocyanate with residual water in the winding is largely suppressed since the reaction time for the formation of $CO_2$ is reduced considerably by initiating the cross-linking of the EP/IC resins immediately after the impregnation or casting process by generation of the Joule heat in the conductor. In addition, the reaction rate of the $CO_2$ formation is reduced by the prevailing overpressure. Also, small amounts of $CO_2$ which may have been formed are distributed and dissolved by the existing overpressure in the low-viscosity reacting EP/IC resin, since the gelling of the EP/IC resins proceeds from the winding toward the outer zones, i.e., not, from the outside in, but from the inside out.

(c) The cross-linking of the EP/IC resins proceeds with the production of considerable heat. The heat production depends here not only on the type and concentration of the reaction accelerator but also on the amount of the IC component in the EP/IC resins. The temperature maxima in the gelling of the EP/IC resins are higher, the larger the isocyanate content. In the method according to the invention, however, the cross-linking can be controlled by the Joule heat in the conductor which is matched to the heat production of the cross-linking reaction in such a way that during the gelling of the EP/IC resins which proceeds from the inside out, no local over-temperatures are produced and only small temperature gradients occur in the entire EP/IC resin substance. Determination of the content of the oxazolidinone and isocyanurate rings formed in the OX/ICR molded materials can be measured in the immediate vicinity of the winding and in the outer zones. The measurement confirms the uniform course of the cross-linking in the entire EP/IC resin substance since it exhibits only small differences.

(d) Due to the short time interval between the casting (of the windings) and the gelling process, the sedimentation of fillers, which may be present, is reduced considerably. Different filler distributions leading to internal stresses can be reduced in this manner.

The method according to the invention for impregnating and embedding windings with EP/IC resins and their cross-linking into OX/ICR molded materials takes into consideration requirements for environment protection. It is known that the epoxy and isocyanate compounds contained in the EP/IC resins can be technically processed for toxicity only with special protective measures. For isocyanates, for instance, an MAK value of 0.02 ppm is given. The critical process steps, if EP/IC resins are used, are their processing as well as their cross-linking all the way to the gelling and post-hardening stage, since the vapor pressures of the EP and IC components rise of necessity in the process and the danger of environment pollution is particularly great. The transport of the windings impregnated or cast-in with EP/IC resins to the hardening oven could therefore be performed only by technically expensive protective measures. With the procedure according to the invention, environment pollution can be prevented since the processing and working of the EP/IC resins is carried out up to the post-hardening in sealed installations in one operation which are under reduced pressure as well as during the steps involving exposure to over pressure. The post-hardening of the windings can then be carried out with the customary protective measures because at this time, the EP/IC resins are already highly cross-linked.

A further advantage of the method according to the invention is the economical processing of the EP/IC resins. The highly reactive and rapidly cross-linking EP/IC resins are utilized completely and the machine and mold occupation times are drastically reduced as compared with the present state of the art of impregnating and embedding windings with epoxy resins. This is due primarily to the simple and rapidly performable chemical drying and degassing of the EP/IC resins as well as to the very short mold occupation times of the windings which are impregnated or cast-over by the EP/IC resins. Thus, the mold occupation times are within 1 to 3 hours with EP/IC resins amounts of up to more than 100 kg, and with large insulation wall thicknesses.

For the method according to the invention for impregnating, embedding and insulating electrical windings, EP/IC resin systems of the following components are suitable. Suitable polyepoxides are suited relatively low viscosity, aliphatic, cycloaliphatic or aromatic epoxides as well as their mixtures. Preferably are used bisphenol-A-diglycidyl ethers; bisphenol-F-diglycidyl ethers; 3,4-epoxy cyclohexylmethyl-3′,4′-epoxy cyclohexane carboxylate; polyglycidyl ethers of phenol/formaldehyde or cresol/formaldehyde-novolak; polyglycidyl ethers of polyalkylene glycoles; polyglycidyl ethers of linear polyurethanes; polyglycidyl esters of dimerized fatty acids as well as mixtures of these epoxy resins. Further usable polyepoxides are hydrogenated bisphenol-A- or bisphenol-F-diglycidyl ethers; hydantoin epoxy resins; triglycidyl isocyanurate; triglycidyl-p-aminophenol; tetraglycidyldiaminodiphenyl methane; tetraglycidyldiaminodiphenyl ether and tetrakis(4-glycidoxyphenyl)-ethane. Further epoxides are described in the "Handbook of Epoxy Resins" by Henry Lee and Kris Neville, McGraw-Hill Book Company, 1967, and in the monograph by Henry Lee "Epoxy Resins", American Chemical Society, 1970.

The suitable polyisocyanates include without limitation relatively low viscosity, aliphatic, cycloaliphatic or aromatic isocyanates as well as their mixtures. Preferably are used isomer mixtures of 4,4'- and 2,4'-diphenylmethanediisocyanate; polyol-modified polyisocyanates and mixtures of liquid polyisocyanates with higher-molecular polyisocyanates or carbodiimide-polyisocyanates. Further suitable polyisocyanates are, for instance, hexane-1,6-diisocyanate; cyclohexane-1,3-diisocyanate and isomers thereof; 4,4'-dicyclohexylmethanediisocyanate; 3-isocyanatomethyl-3,5,5-trimethylcyclohexyl isocyanate; 1,3-dimethylbenzene-w,w'-diisocyanate and isomers; 1-methylbenzene-2,4-diisocyanate and isomers; naphthaline-1,4-diisocyanate; diphenylether-4,4'-diisocyanate and isomers; diphenyl-sulfone-4,4'-diisocyanate and isomers as well as tri- or higher functional isocyanates such as 3,3',4,4'-diphenylmethane tetraisocyanate. In addition, also isocyanates can be used which are masked with phenol or cresol in the usual manner. Dimers and trimers of the mentioned multivalent isocyanates can likewise be used. Such polyisocyanates have free, end-position isocyanate groups and contain one or more uretedione and/or isocyanurate rings. Methods for preparing different kinds of such trimers and uretediones are described, for instance, in U.S. Pat. Nos. 3,494,888; 3,108,100; and 2,977,370.

The EP/IC resins used in the method according to the invention can contain also further components, such as fillers which generally do not participate in the chemical reactions leading to the OX/ICR molded material. Such suitable fillers include mineral and fibrous fillers such as quartz powder, fused silica, aluminum oxide, aluminum oxide trihydrate, glass powder, mica, kaolin, dolomite, graphite and carbon black as well as carbon fibers, glass fibers and textile fibers. Dyes, stabilizers and adhesion agents as well as other additives of conventional type can likewise be added to the EP/IC resins.

In the method according to the invention, the catalyst which aids in the cross-linking, promoting the formation of the OX and ICR rings plays an important role, since a reaction accelerator is used which is "latent" under the processing conditions. Latent in this context means the accelerator can be mixed with the other ingredients whenever it is convenient and will not initiate the cross-linking reaction until certain processing conditions (such as heat) are applied. Thus, such a reaction accelerator is a catalyst which assures a sufficient application time of the EP/IC resins in the impregnation or casting-in of the windings and causes a highly efficient reaction during the subsequent cross-linking (setting) of the EP/IC resins. Such latent reaction accelerators include borotrihalogenide-amine complexes such as the addition complexes, see U.S. Pat. No. 4,131,600 of borotrichloride and tertiary amines of the formula $BCl_3$—$NR^1R^2R^3$, in which $R^1$,$R^2$ and $R^3$ are the same or different organic, i.e., aliphatic, aromatic, hetrocyclic or arylaliphatic radicals which can belong jointly or in pairs to heterocyclic rings. Also suitable are the analogous complexes of the borotrifluoride of the formula $BF_3$—$NR^1R^2R^3$. Specific examples for suitable tertiary amines of the $BF_3$ or $BCl_3$ complexes are dimethyloctylamine and dimethylbenzylamine; also morpholine compounds and imidazoles such as N-methylmorpholine, N-ethylmorpholine, 1,2-dimethylimidazole and 1-benzyl-2-phenylimidazole are suited for the formation of $BCl_3$ or $BF_3$ complexes.

In the method according to the invention, amines can also be used as "latent" reaction accelerators if they are deactivated by the addition of organic electron acceptors which are common in the preparation of EDA complexes. Examples include 1,2-dinitrobenzene or 7,7,8,8-tetracyano-1,4-quinodimethane (TCNQ). Also uncomplexed amines can be used if they have sufficient processing latitude such as is the case, for instance, with 1-cyanoethyl,2-phenylimidazole, 1-cyanoethyl,2-ethyl-4-methylimidazole and N-cyanoethylmorpholine. In connection with this method, also onium salts, for instance, tetraalkyl and tetra-arylammonium tetraphenylborate and phosphoniumtetraphenyl borate are suitable.

The latent reaction accelerator is advantageously used in amounts of 0.01 to 5 percent by weight, and preferably 0.25 to 2.5 percent by weight relative, always referred to the mass of the resin matrix. By the type and concentration of the reaction accelerator, the hardening temperature and time can be influenced in a manner known per se. Like the other additives, the reaction accelerator can be added to the EP/IC resin prior the chemical drying. However, one can also proceed in such a manner that the reaction accelerator is added to the EP/IC resin after the drying, i.e., immediately prior to the impregnation or the casting-in of the winding, preferably dissolved in one of the EP/IC resin components.

The electrical windings to be impregnated or cast-in according to the method of the invention can be made, for instance, of conductors insulated by foils or tape or conductors coated with insulation. These windings can further be reinforced mechanically or supported by fibrous materials, for instance, in the form of woven or non-woven fabrics or rowings.

The method according to the invention will be explained in further detail with the aid of embodiment examples.

The various components of the EP/IC resins used in the examples and the composition of the resins is given in Tables 1 and 2. Generally, commercially available products were used; the reaction accelerator RBI was prepared following known procedures. All reaction accelerators were purified by recrystallization since the latent properties of the reaction accelerators depend heavily on the purity.

EXAMPLE 1

Model high-voltage windings for dry-type transformers, which in the following text are termed transformettes, include four coils and were fabricated as layer insulation of aluminum conductors (0.1 mm thick, 50 mm wide) which were provided with polyimide foil (thickness: 25 um; width: 56 mm), and installed in casting molds. The spaces to be cast full with the EP/IC resins were 6 to 8 mm between the coils as well as between the coils and the wall of the casting mold, and were 12 to 15 mm at the pouring gate. The transformettes were provided with the electrical leads for heating the winding and placed in the casting vessel; then, the pressure in the casting vessel was reduced to 0.1 mbar and a temperature of 70° C. was set for the casting space. Under these conditions, the transformettes were dried and degassed for 1 to 2 hours, while the drying of the windings was partially aided by the Joule heat in the conductor. After the drying was completed, the heating of the windings was shut off.

The EP/IC resin was processed in batches of 25 to 100 kg in a mixing unit mounted above the pouring vessel; EP/IC resin A was used. The polyepoxy, the polyisocyanate, the fillers and, optionally, additives such as adhesion agent or pigments were filled successively into the mixing unit which was preheated to 80° C. and was dried and degassed for one hour at reduced pressure (0.1 mbar) while stirring. Subsequently, the temperature was lowered to 50° C., the reaction accelerator was added and the EP/IC resin was degassed at reduced pressure while stirring for another two hours until the transformettes were cast-in.

The casting-in of the transformettes was accomplished at a pressure of 0.06 to 0.1 mbar within 15 minutes. Subsequently, the reduced pressure was taken away and an overpressure of 3 bar was generated in the pouring vessel with dry nitrogen. Immediately thereafter, the cross-linking reaction of the EP/IC resin was initiated by heating the series-connected windings with dc current.

The heating, which was matched to the reaction heat during the EP/IC resin cross-linking, was controlled via a computer, to which the average winding temperature was fed continuously. Set-in was here a mean winding temperature of 130° C. with a rise time of 10 minutes and a running time of 60 minutes.

In FIG. 1, the temperature curve during cross-linking of the EP/IC resin in model coils is shown by way of example (by means of a computer-controlled winding heating); curve 10 indicates the course of the temperature at the winding and curve 11, the temperature course in the outer zones, i.e., in the vicinity of the casting mold (ambient temperature: 60° to 70° C.).

After the winding heating was turned off, the overpressure in the casting vessel was released whereupon the transformettes were removed from the mold and post-hardened for 6 to 8 hours in the annealing oven at 180° to 200° C. The post-hardened transformettes were tested for their electrical properties and temperature-cycle resistance. Thereupon, pieces were cut or knocked from the transformettes and tested for gas and shrinkage voids. The test data and the test results are listed in Table 3.

EXAMPLE 2 (Reference Test)

The EP/IC resin A was used. The transformettes were pretreated and the cast EP/IC resin was processed like in Example 1. According to the procedure commonly practiced to date, the cast transformettes, however, were gelled, removed from the mold and post-hardened in a recirculating-air oven. The temperature in the recirculating air oven was set to 130° C.; the post-hardening of the transformettes taken from the mold after 3 hours took place for a period of 5 hours at 150° C. and thereafter for 8 hours at 180° C.

Figure 2:
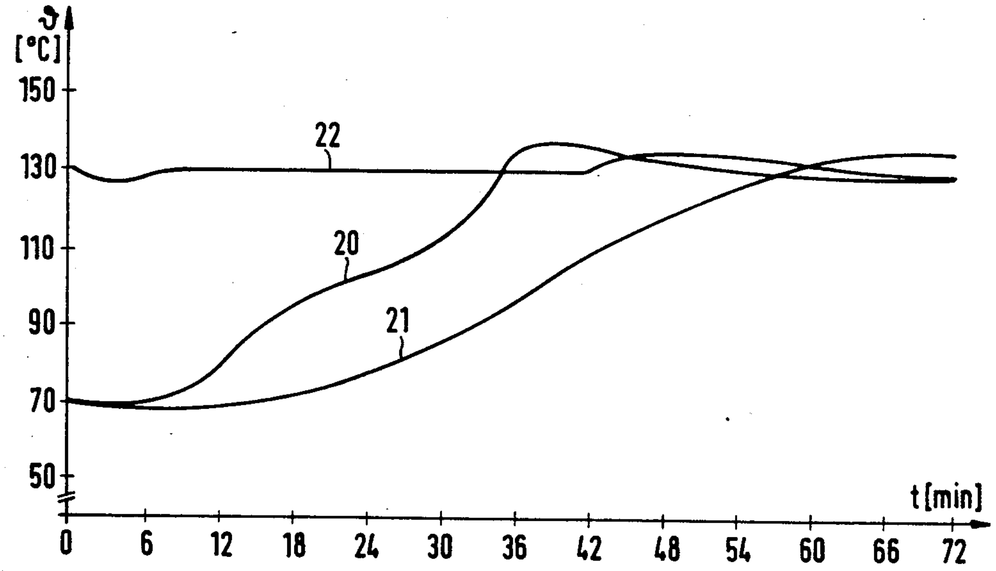

In FIG. 2, the temperature in the EP/IC resin is shown for the cross-linking in the immediate vicinity of the casting mold (curve 20) and in the immediately vicinity of the winding (curve 21) as well as for the oven temperature (curve 22). During the first 30 minutes, the curve 20 (casting mold temperature) is distinctly higher than curve 21 (winding temperature). The casting mold temperature then exceeds the oven temperature (curve 22) and reaches a value of about 140° C.; due to heat radiation, the oven temperature is also increased, specifically to about 135° C. After about 1 hour, the winding temperature (curve 21) exceeds the casting mold and the oven temperature successively and rises to about 140° C.

It is understandable that under the described conditions, high internal stresses are present in the OX/ICR molded material of the transformettes and the latter exhibit cracks produced as soon as the period for cooling-off to room temperature is reached.

The transformettes show also a distinct loss especially at the pouring gate. The pieces cut from the transformettes furthermore show many voids so that they are no longer usuable for electrical tests. Lowering the oven temperature from 130° C. to 110° C. or reducing the reaction accelerator content from 1.5 percent to 1 percent as well as exchanging the reaction accelerator RBI for the accelerator RBII (1-cyanoethyl-2-phenylimidazole) which reacts more sluggishly, likewise yields unusable transformettes.

EXAMPLE 3 (Reference Test)

The tests according to Example 2 were repeated, but the EP/IC resins in the annealing oven, after exposure to an overpressure of 3 bar, were cross-linked up to the removal from the mold. While the post-hardened transformettes show less of a tendency to stress crack while they are cooling down to room temperature, cracks then occur usually during temperature-cycling stress. Furthermore, the cut-out pieces in the OX/ICR molded material frequently show small voids particularly in the vicinity of the winding, so that these transformettes could be tested electrically only partially.

EXAMPLES 4 AND 5

Figure 3:
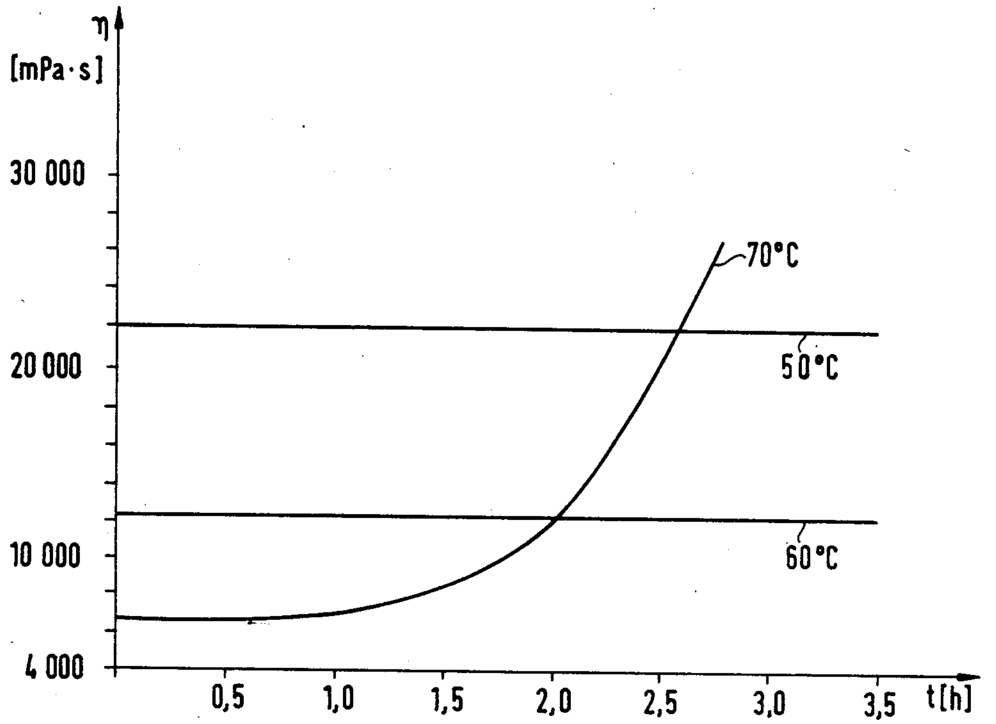

The EP/IC resins B and C were used. The pretreatment of the transformettes and the processing of the EP/IC resins were carried out in analogy with Example 1. Because of the increased viscosity of the EP/IC resins and due to the use of fused silica as the filler, the temperature in the mixing unit was lowered from 80° C. to only 60° to 65° C. before the reaction accelerator was added; this was also possible due to the excellent latent properties of the accelerator RBI to 70° C. (see in connection therewith FIG. 3, in which the rise of the viscosity is shown as a function of the temperature). For controlling the heating current in the winding, a program was set which was changed from Example 1 as follows: winding temperature, 110° C.; build-up time 10 minutes; running time 30 minutes; and subsequently, the winding temperature 140° C.; build-up time, 10 minutes; running time, 30 minutes. Table 3 contains the test results on these transformettes.

EXAMPLES 6 AND 7

The EP/IC resins D and E were used. The pretreatment of the transformettes took place in analogy to Example 1, but the temperature in the casting vessel was lowered from 70° C. to 50° C. prior to the casting.

The processing of the EP/IC resin (component a) took place in analogy to Example 1, but without the addition of the reaction accelerator. The reaction accelerator was dissolved at room temperature in a second small mixing unit in polyisocyanate (component b). This procedure was chosen because the reaction accelerator RBII used here exhibits no latent property as pronounced as by the accelerator RBI. The casting of the windings took place at reduced pressure, where the components a and b were combined and metered via a static mixing tube. The cross-linking and post-hardening of the EP/IC resins took place in analogy with Example 1. The test data of the transformettes are reproduced in Table 3.

EXAMPLE 8

The EP/IC resin F was used. The design of the transformettes (corresponding to Example 1) was changed in such a direction that the four coils contain foils of aromatic polyamide as the layer insulation, the coils were mechanically reinforced by fiber glass tape and the distance between the coils and the casting mold wall was reduced to 2 mm. The transformettes were dried and degassed in accordance with Example 1. The processing, drying and degassing of the EP/IC resin in the mixing unit took place for 3 hours while stirring and at reduced pressure (0.1 mbar) at 60° C., where the reaction accelerator was added after 1 hour. The EP/IC resins were cast and cross-linked following the procedures of Example 1. The following program was set-in for controlling the heating current in the winding; winding temperature 100° C.; build-up time, 10 minutes; running time, 30 minutes; and subsequently, the winding temperature 130° C.; building-up time 15 minutes; running time, 30 minutes, and then, winding temperature 150°; build-up time 15 minutes; running time, 30 minutes.

TABLE 1

| Components (of the EP/IC resins) | Abbreviated Designation | Epoxy Value mol/100 g | Isocyanate Value mol/100 g |
|---|---|---|---|
| Bisphenol-A—diglycidyl ether | EP I | 0,56–0,58 | — |
| isomeric bisphenol-F—diglycidyl ether | EP II | 0,60–0,62 | — |
| polybutylene glycol diglycidyl ether | EP III | 0,22–0,24 | — |
| novolak epoxy resin | EP IV | 0,56–0,58 | — |
| isomeric diphenyl methane diisocyanate | IC I | — | 0,78–0,80 |
| carbodiimide-polyisocyanate | IC II | — | 0,67–0,69 |
| quartz powder 16 900 M/cm$^2$ | QM | — | — |
| fused silica | QG | — | — |
| borontrichloride-dimethylbenzylamine adduct | RB I | — | — |
| 1-cyanoethyl-2-phenylimidazol | RB II | — | — |

TABLE 2

| EP/IC resin | Polyepoxy | Polyisocyanate | Mol Ratio EP:IC | Reaction Accelerator in %[1] | | Filler in % | |
|---|---|---|---|---|---|---|---|
| | | | | RB I | RB II | QM | QG |
| A | EP I | IC I | 2:1 | 1,5 | — | 66 | — |
| B | EP II | IC I | 1:1 | 1,0 | — | — | 66 |
| C | EP III, EP IV[2] | IC I | 1:2,7 | 1,5 | — | — | 66 |
| D | EP II | IC I | 2:1 | — | 1,5 | — | 66 |
| E | EP II | IC II | 1:1 | — | 1,0 | — | 66 |
| F | EP III, EP IV[3] | IC I | 1:2,5 | 1,0 | — | — | — |

[1]Referred to the resin matrix without filler
[2]mol ratio EP III:EP IV = 1:2,5
[3]mol ratio EP III:EP IV = 1:3

TABLE 3

| Example No. | EP/IC resin | Temperature Change From 200° C. To 25° C. | Temperature Change From 25° C. to −40° C. | Void Formation | Partial Discharge Set-in Voltage kV | Breakdown Voltage kV | Surge Current Resistance at −30° C. (A/mm$^2$)$^2$ · s |
|---|---|---|---|---|---|---|---|
| 1 | A | No cracks | No cracks | None | 11–19 | 55–70 | 5000 |
| 2 | A | Cracks | Increased Crack Formation | Numerous | — | — | — |
| 3 | A | Isolated Cracks | Usually Cracks | Slight | — | — | — |
| 4 | B | No cracks | No cracks | None | 15–22 | 60–85 | 4000 |
| 5 | C | No cracks | No cracks | None | 20–30 | 60–80 | 10000 |
| 6 | D | No cracks | No cracks | None | 15–25 | 50–80 | 6000 |

What is claimed is:

1. A method for impregnating and embedding an electrical winding, with a polyepoxide-polyisocyanate resin mixture in the presence of a reaction accelerator which is latent under the processing conditions, which comprises:

(a) drying the resin mixture at a reduced pressure and at a temperature up to 110° C., while stirring, to produce a dried resin mixture;

(b) drying the electrical winding and impregnating the winding with the dried resin mixture under conditions of reduced pressure and a temperature up to 110° C. to produce a cast-in winding;

(c) applying an overpressure above atmospheric to the cast-in winding;

(d) elevating the temperature of the cast-in winding while maintaining said overpressure by generating Joule heat in the winding and, controlling the temperature as a function of the reaction heat to initate a cross-linking reaction of the resin mixture impregnated in the cast-in winding and produce a hardened cast-in winding; and (e) post-heating the hardened, cast-in winding so that the cross-linked resin mixture is post-hardened.

2. A method according to claim 1 wherein the resin mixture is dried at about 50° to about 80° C.

3. A method according to claim 1 wherein the electrical winding is impregnated with the dried resin mixture at a temperature of from about room temperature to about 80° C. mixture.

4. A method according to claim 1 wherein an overpressure of 1 to 3 bar is applied in step (c).

5. A method according to claim 1 wherein the elevated temperature of step (d) is about 60° to about 140° C.

6. A method according to claim 1 wherein prior to impregnating with the resin mixture, the electrical winding is dried at a temperature up to about 80° C. and at a reduced pressure.

7. A method according to claim 6 wherein the electrical winding is dried by generating Joule heat in the conductor.

8. A method according to claim 1 wherein the latent reaction accelerator is selected from an addition complex of a boron trihalogenide with a tertiary amine or imidazole, an onium salt or an amine which is deactivated by an organic electron acceptor.

9. A method according to claim 1 wherein the latent reaction accelerator is N-cyanoethyl morpholine or a substituted 1-cyanoethylimidazole.

10. A method according to claim 1 wherein the content of the latent reaction accelerator in the resin mixture is 0.01 to 5% by weight.

11. A method according to claim 10 wherein the content of accelerator in the mixture is 0.25 to 2.5% by weight.

12. A method according to claim 1 wherein the post-heating is carried out at a temperature up to 200° C.

13. A method according to claim 1 wherein the resin mixture contains an additive.

14. A method according to claim 13 wherein the additive is a mineral and/or fibrous filler.

* * * * *